(12) United States Patent
Brito Lopes et al.

(10) Patent No.: US 11,484,862 B2
(45) Date of Patent: Nov. 1, 2022

(54) NETWORK HEAT EXCHANGER DEVICE, METHOD AND USES THEREOF

(71) Applicant: PETROGAL, S.A., Lisbon (PT)

(72) Inventors: José Carlos Brito Lopes, Oporto (PT); Madalena Maria Gomes de Queiroz Dias, Oporto (PT); Marcelo Filipe Dos Santos Costa, Santiago da Riba-Ul (PT); Ricardo Jorge Nogueira dos Santos, São Mamede de Infesta (PT); Carlos André De Moura Teixeira, Oporto (PT)

(73) Assignee: PETROGAL, S.A., Lisbon (PT)

( * ) Notice: Subject to any disclaimer, the term of this patent is extended or adjusted under 35 U.S.C. 154(b) by 489 days.

(21) Appl. No.: 16/603,492

(22) PCT Filed: Apr. 9, 2018

(86) PCT No.: PCT/IB2018/052463
§ 371 (c)(1),
(2) Date: Oct. 7, 2019

(87) PCT Pub. No.: WO2018/185736
PCT Pub. Date: Oct. 11, 2018

(65) Prior Publication Data
US 2021/0291140 A1     Sep. 23, 2021

(30) Foreign Application Priority Data

Apr. 7, 2017 (PT) .......................................... 110019
Jul. 4, 2017 (EP) ..................................... 17179636

(51) Int. Cl.
*B01J 19/24*     (2006.01)
*B01J 19/00*     (2006.01)
(Continued)

(52) U.S. Cl.
CPC ........... *B01J 19/249* (2013.01); *B01J 19/006* (2013.01); *B01J 19/0093* (2013.01); *F28F 3/12* (2013.01);
(Continued)

(58) Field of Classification Search
CPC .... B01J 19/249; B01J 19/006; B01J 19/0093; B01J 2219/00763; B01J 2219/00783;
(Continued)

(56) References Cited

U.S. PATENT DOCUMENTS 6,655,829 B1 * 12/2003 Vanden Bussche .. B01F 25/422
366/173.1
8,764,279 B2 * 7/2014 Castro ..................... B01F 33/30
366/DIG. 2
(Continued)

FOREIGN PATENT DOCUMENTS

DE      19945832 A1      4/2001
EP       1720643 B1     10/2008
(Continued)

OTHER PUBLICATIONS

International Search Report and Written Opinion dated Jun. 7, 2018 corresponding to International Patent Application No. PCT/IB2018/052463; 3 pages.
(Continued)

*Primary Examiner* — Huy Tram Nguyen
(74) *Attorney, Agent, or Firm* — Leason Ellis LLP

(57) ABSTRACT

A chemical reactor/mixer, in particular for producing hydrates comprising a mixer network plate and heat exchanger plates wherein the network mixer plate comprises an array of chambers that are connected by channels where the flow of one or more fluids is mixed and divide sequentially. The network mixer plate is confined by the heat exchanger plate that have an inner chamber where a heat
(Continued)

exchanger fluid is introduced. Said network plates and heat exchanger plates are designed to have the option to be assembled as modules of larger processing units.

13 Claims, 4 Drawing Sheets

(51) Int. Cl.
    *F28F 3/12* (2006.01)
    *F28F 13/12* (2006.01)
(52) U.S. Cl.
    CPC ..... *F28F 13/12* (2013.01); *B01J 2219/00763* (2013.01); *B01J 2219/00783* (2013.01); *B01J 2219/00873* (2013.01); *B01J 2219/00889* (2013.01); *B01J 2219/2462* (2013.01)
(58) Field of Classification Search
    CPC .... B01J 2219/00873; B01J 2219/00889; B01J 2219/2462; B01J 19/00; B01J 19/24; F28F 3/12; F28F 13/12; B01F 25/43231; B01F 33/30; B01F 25/40
    USPC .................................................... 165/109.1
    See application file for complete search history.

(56) References Cited

U.S. PATENT DOCUMENTS

| 2002/0106311 A1 | 8/2002 | Golbig et al. |
| 2004/0100861 A1 | 5/2004 | Abdo |

FOREIGN PATENT DOCUMENTS

| EP | 2090353 A1 | 8/2009 |
| WO | 2006031058 A1 | 3/2006 |

OTHER PUBLICATIONS

Thakur RK; Vial C; Nigam KDP; Nauman EB; Djelveh G, "Static Mixers in the Process Industries—A Review", Chem. Eng. Res. Des., (20030000), vol. 81, No. 7, doi:doi:10.1205/026387603322302968, pp. 787-826, XP022536538.

* cited by examiner

NETWORK HEAT EXCHANGER DEVICE, METHOD AND USES THEREOF

CROSS REFERENCE TO RELATED APPLICATIONS

This application is a U.S. National Stage Application under 35 U.S.C. § 371 of International Patent Application No. PCT/IB2018/052463, filed Apr. 9, 2018, which claims priority to Portugal Application No. 110019, filed Apr. 7, 2017, and EP Application No. 17179636.0 filed Jul. 4, 2017, all of which are hereby incorporated by reference in their respective entireties.

TECHNICAL FIELD

This invention relates to a chemical reactor/mixer and respective method for the continuous heat transfer between fluids flowing in a meso or micro structured mixing network plate, hereafter designated as the network mixer plate, and the heat exchanger plates that are adjacent to said network plate.

The present disclosure enables to assemble sets of said plates into modules having any number of installed plates and of plates at operation, which enables dynamic flexible production rates. The network plate is a device with application on the mixing of two or more fluids or on the contacting of fluids with a catalyst and it is generally used for chemical processes. Chemical reaction, mixing of fluids and change of phase of materials always involve heat release or absorption and temperature guidance is often paramount. Temperature control inside said network plate is made from transferring heat to adjacent heat exchanger plates using a hot medium inside said plate, for example water vapour, or a cold medium, for example a refrigerant. This device and method of heat transfer are of application, for example in gas to liquid or solid processing, or in catalytic chemical reactions. The preferred field of application for this invention is in the chemical processes and apparatus.

BACKGROUND OF THE INVENTION

Static mixers have been used in industrial applications to perform continuous operations and have become standard equipment since the 1970s, as an alternative to mechanical mixers, for mixing of miscible or immiscible fluids, homogenization of solid particles, and for heat and mass transfer enhancement. This type of mixers is applied in a wide range of different industrial processes in the pharmaceutical, petrochemical, food, cosmetics, biotechnology, water/wastewater, paper and polymer industries. The effectiveness of static mixers to deliver good mixing of miscible fluids or to enhance heat and mass transfer rates comes from their capacity to induce transverse mixing and to bring fluid elements into close proximity. One of the most interesting characteristics of these mixers is that the products are mixed by flow energy alone, thus they do not require external power except the required power for pumping the fluids through the mixer; furthermore static mixers usually require small space, low equipment cost and no moving parts. However, the use of static mixers usually originates an increase of the overall system pressure drop as well as greater potential for fouling, relative difficulty for cleaning and greater cost.

In many chemical processes/reactions it is a main requisite an effective and precise control of the operational fluid temperatures. This is particularly critical for highly exothermic or endothermic reactions, where the heat transfer rates become crucial. Most heat exchange devices are designed so as to operate in the turbulent regime, since it is commonly considered that laminar regime is not efficient from a heat transfer point of view. Some authors have proposed chaotic advection as a means to enhance heat transfer in laminar flows, as it happens in static mixers. Cross-section heat transfer enhancement is due to the appearance of secondary transverse flows, improving transverse mixing coupled to flow division, promoted by the geometry of the static mixer. This results in the virtual elimination of boundary layers that form the dominant resistance to heat transfer in pipe flow.

Heat transfer enhancement caused by the use of static mixers is not a new topic, and several authors have already described the benefits of the use of different type of static mixers, by reporting the dimensionless heat transfer coefficient, the Nusselt number, in the form of correlations useful for the design of heat exchange equipment. Some authors have shown that the heat transfer coefficients can be enhanced 2-3 times in Kenics static mixers operating in laminar regime, while for Sulzer SMX static mixers, the heat transfer rate can be enhanced by a factor of 5 when compared with that in an empty tub A first compilation on correlations for the Nusselt number obtained experimentally in tubes containing commercially available static mixers is given in Thakur R K, Vial C, Nigam K D P, Nauman E B, Djelveh G. Static Mixers in the Process Industries—A Review. Chem. Eng. Res. Des. 2003; 81(7):787-826. Heat exchangers that include static mixing elements have become commercially available and are currently used in the industry.

These facts are disclosed in order to illustrate the technical problem addressed by the present disclosure.

General Description of the Invention

The present disclosure enables to assemble sets of said plates into modules having any number of installed plates and of plates at operation, which enables dynamic flexible production rates. The network plate is a device with application on the mixing of two or more fluids or on the contacting of fluids with a catalyst and it is generally used for chemical processes. Chemical reaction, mixing of fluids and change of phase of materials always involve heat release or absorption and temperature guidance is often paramount. Temperature control inside said network plate is made from transferring heat to adjacent heat exchanger plates using a hot medium inside said plate, for example water vapour, or a cold medium, for example a refrigerant. This device and method of heat transfer are of application, for example in gas to liquid or solid processing, or in catalytic chemical reactions. The preferred field of application for this invention is in the chemical processes and apparatus.

An aspect of the present disclosure relates to a chemical reactor for exothermic or endothermic processes comprising a stack of a network mixer plate for performing the reaction and a heat exchanger plate, wherein the network mixer plate comprises an array of chambers, each chamber being interconnected by at least two channels to at least two other chambers, for mixing and dividing one or more reaction fluids sequentially through said chambers, wherein the heat exchanger plate comprises a channel for the flow of a thermofluidic, wherein the channel of the heat exchanger plate and the chambers of the network mixer plate are lined up to transfer heat between said chambers and said channel, wherein each chamber of the network mixer plate is a spherical or cylindrical chamber, comprising two or three channels and two or three apertures for connection to said channels.

The chemical reactor for exothermic or endothermic processes of the present disclosure maintains the large specific surface areas of micro-reactors, and additionally increases simultaneously the specific heat transfer capacities, mainly in the meso structured devices.

In an embodiment for better results, wherein the chambers and channels of the network mixer depth may be between 0.25 mm and 10 mm.

In an embodiment for better results, the chambers diameters of the network mixer may be between 1 mm and 50 mm and channels width or diameters are between 0.25 mm and 10 mm.

In an embodiment for better results, the Reynolds number of the network mixer flow (Re) may be larger than 100; preferably between 125 and 1000. The Reynolds number (Re) is defined at the channels as $Re=(\upsilon\varphi)/\nu$, where $\nu$ is the kinematic viscosity of the fluid, $\varphi$ is the width or diameter of the channels and $\upsilon$ is the space averaged flow velocity in the channels.

In an embodiment for better results, the reactor/mixer may comprise two heat exchanger plates wherein the network mixer plate is stacked between the heat exchanger plates.

In an embodiment for better results, at least two of the channels interconnected to each chamber of the network mixer plate may be oblique relatively to the overall direction of fluid flow within the network mixer plate.

In an embodiment for better results, the channel of the heat exchanger plate may be a meandering channel.

In an embodiment for better results, the channel of the heat exchanger plate may comprise two or more interconnected cavities.

In an embodiment for better results, the cavities may comprise baffles.

In an embodiment for better results, the heat exchanger plate comprises one or more through openings for fluid flow to, or from, or to and from, the network mixer plate.

In an embodiment for better results, the reactor/mixer of the present disclosure may comprise a plurality of said network mixer plates and a plurality of said heat exchanger plates such that each network mixer plate is placed contiguously between two heat exchanger plates.

In an embodiment for better results, the plates may comprise lateral inlets and lateral outlets.

In an embodiment for better results, the plates may comprise top inlets and bottom outlets connecting with contiguous plates.

In an embodiment for better results, the reactor/mixer may comprise one or more lid plates for providing fluid-tightness to said channels and/or chambers.

In an embodiment for better results, each chamber of the network mixer plate is a spherical or cylindrical chamber, comprising two or three channels and two or three apertures for connection to said channels.

The present disclosure relates to a method and the reactor/mixer for heat transfer in processes where a fluid or several fluids undergo a transformation, such as chemical reaction or phase change, that releases or absorbs heat. In such cases the temperature of the fluids is changed by an endothermic or exothermic process and thus heat must be supplied or removed from the process to control the fluids to a proper temperature range. Said processes take place in meso or micro structured network plates that consist of plates having an array of interconnected carved cavities, where said cavities are generally of cylindrical or spherical shape and are hereafter designated by mixing chambers. Said mixing chambers are interconnected by channels, which are generally of prismatic or cylindrical shape. The fluids flow through this network of interconnected mixing chambers and channels. The flow from one or more channels goes into a mixing chamber where fluid or fluids from different channels are mixed. The mixed fluid or fluids flow out the said mixing chamber by one or more channels which divide the outgoing flow to more than one downstream mixing chambers. Mixing chambers at the first row receive the fluids from dispensing units through single or multiple inlet channels. Mixing chambers at the last row can have single or multiple outlet ports. FIG. 2 shows a possible embodiment of a network mixer plate (or network mixer) in a preferred embodiment the said plate may be the static mixer device disclosed in the examples and drawings of EP1720643 B.

In an embodiment, the network mixer plates are connected to at least one adjacent heat exchanger plate or more typically each network plate is stacked between two heat exchanger plates. The heat exchanger plates have one or more inner cavities where a hot or cold fluid flows for heat transfer with the fluids in the network plate. Fluids for heat transfer operate by temperature difference to the inside of the network plate, and can also operate by phase change for example condensation for heating purposes of the network plate or evaporation for refrigeration of the said plate. These fluids flowing through the heat exchanger plate for heat transfer purposes are hereafter referred to as thermofluids. The cavities in the heat exchanger plates have one port, or more than one, for inlet and outlet purposes of the said thermofluids. Said cavities can be connected directly to the inlet and outlet ports or interconnected to adjacent cavities in the plate. Each cavity can be a hollow parallel structure with or without baffles. Heat exchanger plates can have connection slots aiming the passage of pipes or acting as channels that connect the feed streams to inlet ports and outlet ports of network plate. The said connection slots are isolated from the cavities where thermofluid flows. In addition, said connection slots can be designed to distribute fluid to more than one inlet chamber or to collect fluid from several outlet ports of the discharging chambers of the network plate.

In an embodiment, each set of one network plate and one or two heat exchanger plates are stacked so the cavities in the heat exchanger plates are lined up to transfer heat with the chambers and channels in the network plate. This particular, arrangement is hereafter designated as the basic unit. Depending on the arrangement of the heat exchanger plates one or more lids may be required for the basic unit. This invention has a modular structure that enables the stacking of multiple basic units. Stacking the units requires that connection pipes have a different arrangement than in FIG. 1, where said pipes are entering though the top of the heat exchange lids, while in stacked units these pipes have to enter laterally, except when said pipes connect heat exchangers from different basic units or are for the basic units at the top or bottom of the stack. Said basic units operate simultaneously, the number of operating basic units is used to adjust the production rate enabling flexible production rates that can be set dynamically.

DESCRIPTION OF THE DRAWINGS

For an easier comprehension of the invention some figures are added, which represent preferred embodiments of the invention, although not intend to limit the object of the present invention.

DETAIL DESCRIPTION

Figure 1:
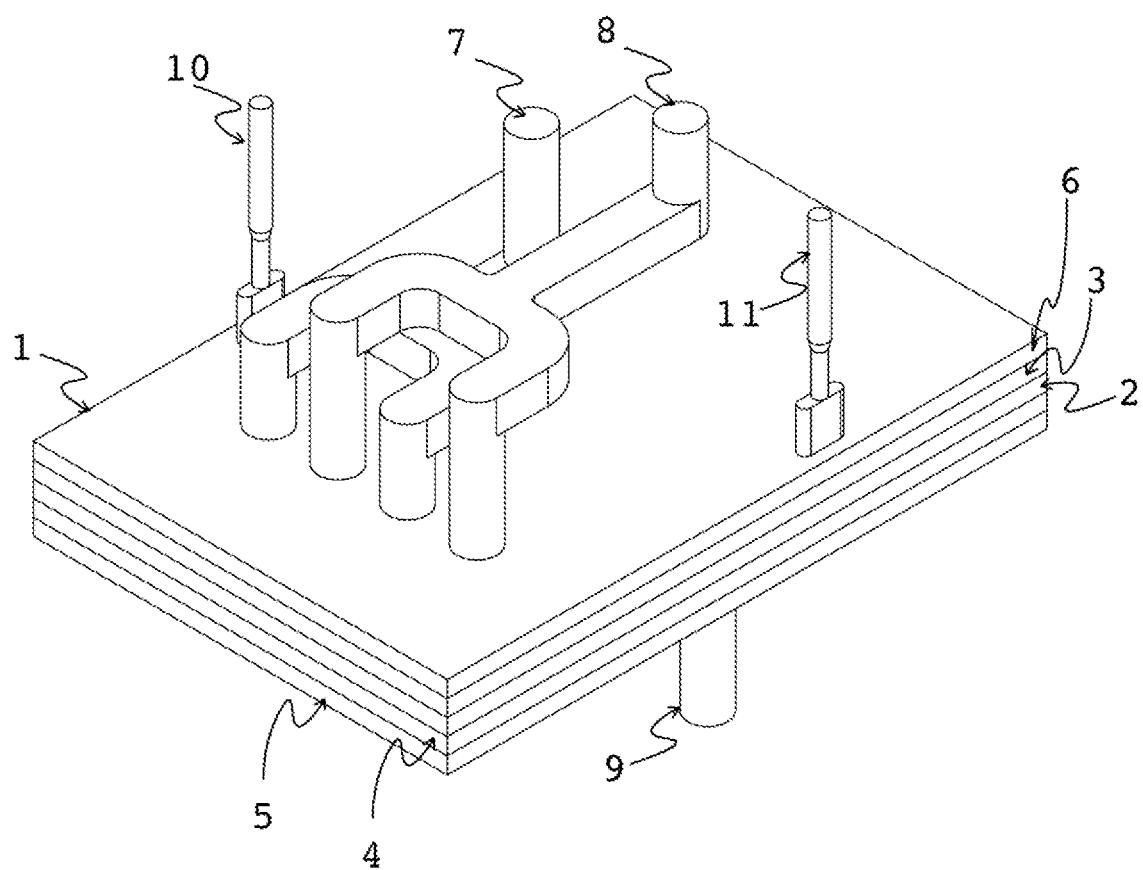
FIG. 1: Layout of the basic unit of the heat exchanger device [1] with an assembly of one network plate [2] stacked with two heat exchanger plates, one on top [3] and the other on the bottom [4] and respective lids of said heat exchanger plates [5 and 6]. This particular embodiment has two inlets for introducing fluids in the network plate, inlet channel [7] introduces fluid in two mixing chambers while inlet chamber [8] introduces fluid into two other mixing chambers. The outlet [9] of the network plate is the pipe at the bottom of the device. Thermofluid enters in the top heat exchanger plate from port [10] and leaves through port [11].
Figure 2:
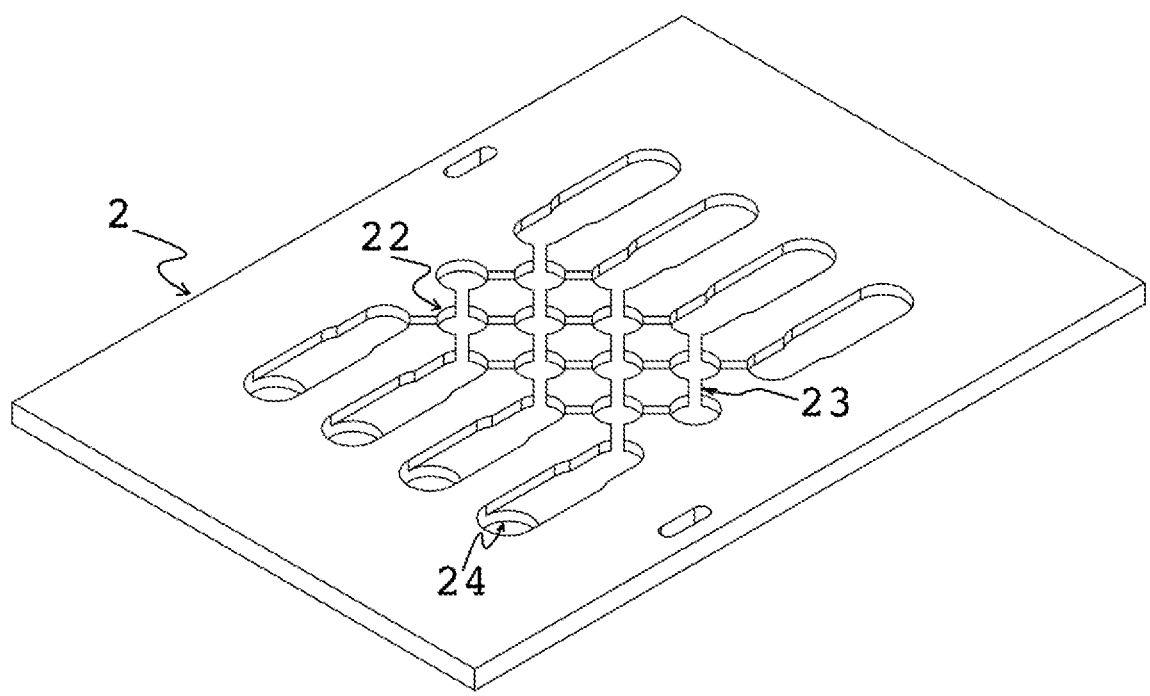
FIG. 2: Network mixer plate [2] with cylindrical mixing chambers [22] and prismatic channels [23] that connect said mixing chambers [22] and identification of possible locations for fluids inlet [24] at the first row of mixing chambers. The network plate [2] in the drawing is an array of five lines of mixing chambers and four mixing chambers [22] in the first line.

The present disclosure relates to a modular device consisting of network plates and heat exchanger plates. Network plates consist of an array of chambers that are connected by channels where the flow of one or more fluids is mixed and divide sequentially. The network plates are confined by heat exchanger plates that have an inner chamber where a cold or hot source is introduced. Said network plates and heat exchanger plates are designed to have the option to be assembled as modules of larger processing units.

In an embodiment the network plates may be the static mixer described in EP 1 720 643 B, namely in the drawings and examples.

In an embodiment, a basic unit where two fluids are introduced in the network plate: a gas and a liquid. The network plate has five lines of cylindrical mixing chambers and in the odd lines the number of chambers is four and in the even lines the number of chambers is three. Said mixing chambers are connected by prismatic channels. The gas is introduced in the even numbered mixing chambers of the first line while the liquid is introduced in the odd numbered mixing chambers of the first line. The gas is absorbed by the liquid releasing heat that is removed by a utility, such as cold water, flowing inside two heat exchanger plates adjacent to the network plate. The liquid is introduced into the mixing chambers from a connection slot in the top heat exchanger plate that is connected to the mixing chambers inlet ports by cylindrical pipes. The gas is introduced into the mixing chambers from a connection slot in the bottom heat exchanger plate that is connected to the mixing chambers inlet ports by cylindrical pipes. The liquid mixture saturated with gas is discharged from the last row of mixing chambers into a single connection slot in the heat exchanger plate where said chambers are connected by cylindrical pipes issuing from their outlet ports.

Another embodiment, it relates to a large-scale production facility for the treatment of an acid gaseous effluent with alkaline aqueous solution, where the flow rates change during the day. The basic unit is a network plate stacked between two heat exchanger plates having the characteristics described in previous application example, where for the present example the liquid is the alkaline aqueous solution and the gas is the gaseous effluent. The network plate has five lines of cylindrical mixing chambers and in the odd lines the number of mixing chambers is four and in the even lines the number of mixing chambers is three. Said mixing chambers are connected by prismatic channels. The gaseous effluent is introduced in the even numbered mixing chambers of the first line while the alkaline aqueous solution is introduced in the odd numbered mixing chambers of the first line. The acid gas is absorbed by the liquid releasing heat that is removed by a thermofluid, cold water, flowing inside the two heat exchanger plates one above and the other below the network plate. The alkaline aqueous solution is introduced into the mixing chambers from a connection slot in the bottom heat exchanger plate that is connected to the mixing chambers inlet ports by cylindrical pipes drilled in the plates. The gas is introduced into the mixing chambers from a connection slot in the bottom heat exchanger plate that is connected to the mixing chambers inlet ports by cylindrical pipes drilled in the plates. A liquid saturated with the neutralised gas is formed in the network plate and it is discharged from the last row of mixing chambers into a single connection slot in the heat exchanger plate where said chambers are connected by cylindrical pipes issuing from their outlet ports. An assembly of one hundred basic units stacked over each other having a pipe manifold for gas and alkaline aqueous solution distribution over the stacked basic units. The pipe manifold for liquid distribution has valves on the connection to the basic units, and said valves enable to dynamically change the number of basic units in operation and in this way adjust the device to the production rate. Similar manifold scheme is used for the circulation of cold water through the heat exchanger plates.

Another embodiment, it relates to a catalytic endothermic reaction occurring at liquid phase. The basic unit is a network plate stacked between two heat exchanger plates. The network plate has five lines of cylindrical mixing chambers and in the odd lines the number of mixing chambers is six and in the even lines the number of mixing chambers is five. Said mixing chambers are connected by prismatic channels. The liquid is introduced in the first line of mixing chambers. In the first two lines of chambers the liquid flows in the network for achieving the required temperature for reaction to occur. In lines three to five the mixing chamber walls are coated with a catalyst that is going to onset the chemical reaction. Heat for the endothermic reaction is supplied by hot water vapour utility flowing inside the two heat exchanger plates one above and the other below the network plate. The liquid is introduced into the mixing chambers from a connection slot in the bottom heat exchanger plate that is connected to the mixing chambers inlet ports by cylindrical pipes drilled in the plates. The outlet liquid is discharged from the last row of mixing chambers into a single connection slot in the heat exchanger plate where said chambers are connected by cylindrical pipes issuing from their outlet ports. Top and bottom heat exchanger plates have two cavities, the first cavity is in the location next to the two first rows of mixing chambers and serves to set the initial temperature of the reactant. The second cavity is in the location next to the third to fifth rows of mixing chambers and supplies heat for the endothermic reaction to take place. The water vapour utility used in the different cavities can have the same or different temperatures.

In the present disclosure, the fluids flowing in the mixing chambers are always at short distances from the thermofluid in the network plates, which decreases solid conduction resistances to heat transfer. Furthermore, global heat transfer coefficients larger than 1000 $W \cdot m^{-2} \cdot K^{-1}$ (reference value for the state of the art), can be achieved in the smallest space necessary for the network plate cavities, minimizing the size of the basic unit.

Figure 3:
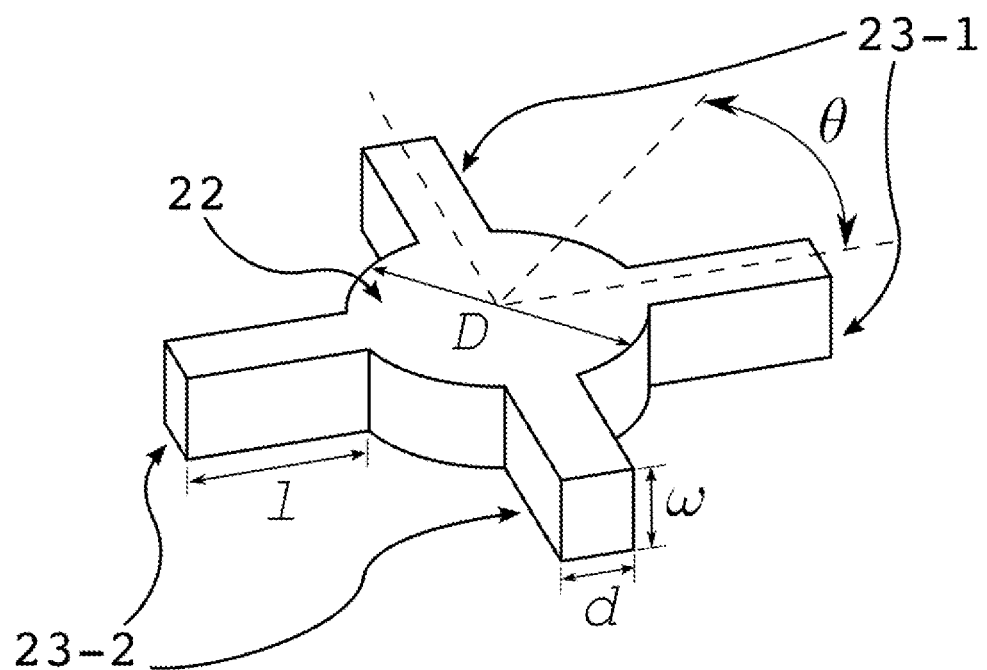
FIG. 3: Cylindrical mixing chamber with diameter D [22] having two inlet prismatic chambers with length l and width d [23-1] and two outlet prismatic channels with same dimensions [23-2]. Said mixing chamber [22] and prismatic channels [23-1 and 23-2] have depth w.
Figure 4:
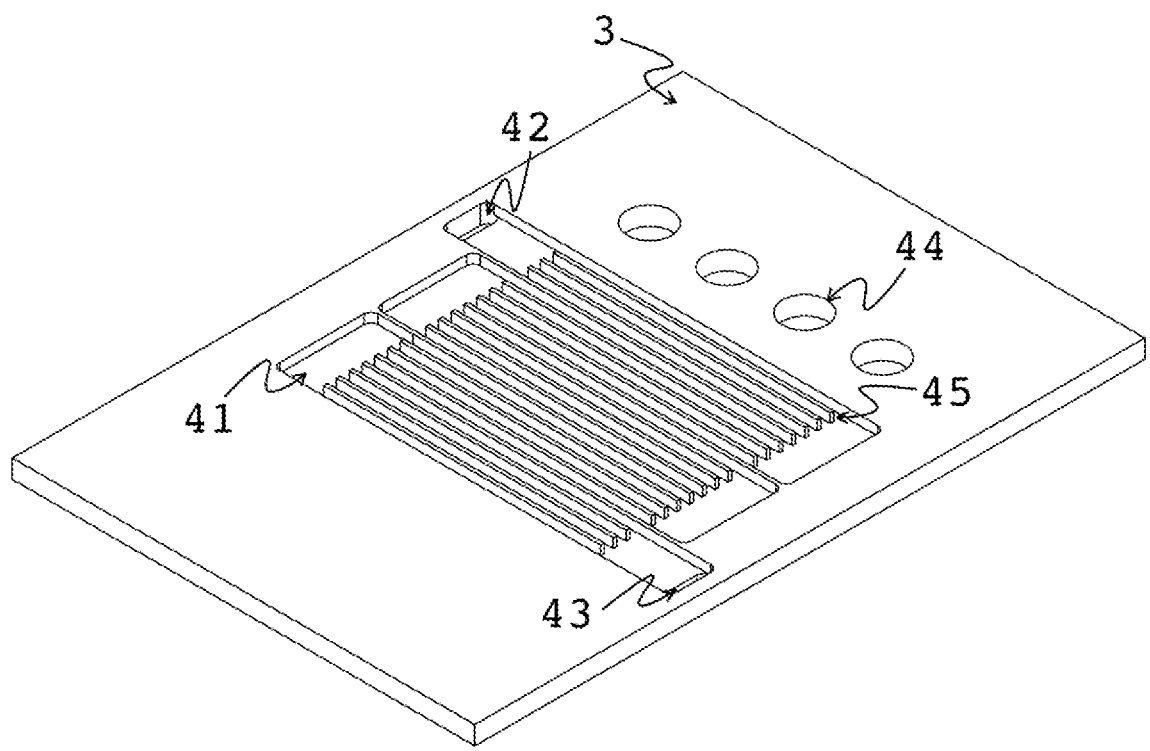
FIG. 4: Heat exchanger plate [3] with a possible embodiment of the cavity [41] for the heat transfer fluid circulation and identification of the chamber inlet [42] and outlet [43] and possible configuration for hydraulic passages, connection slots [44], of inlet and outlet pipes to the network plate. This plate has baffles [45] in the cavity for thermofluid circulation [2].
Figure 5:
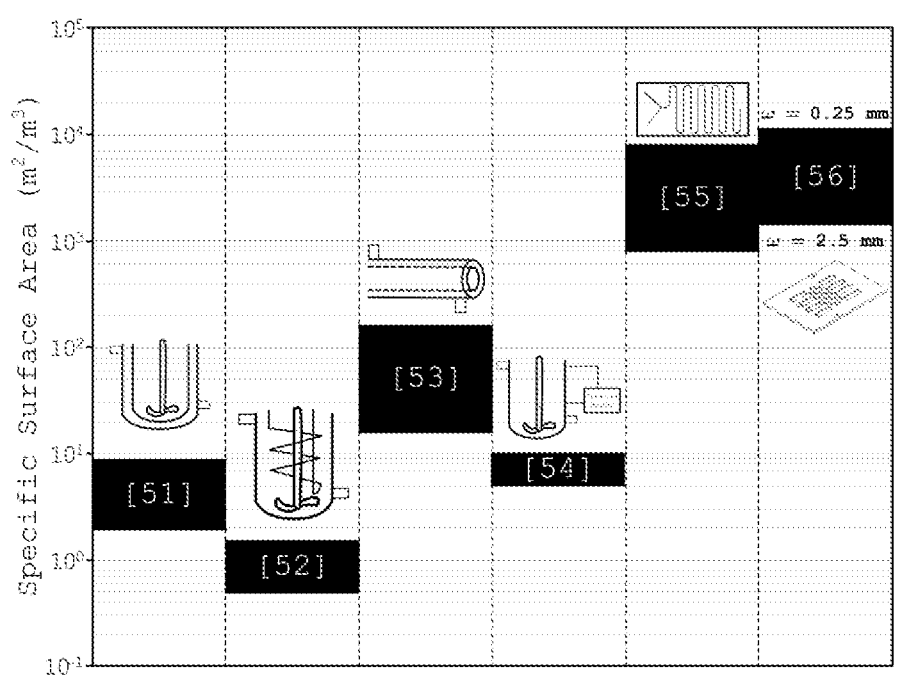
FIG. 5: Specific surface area for jacketed stirred tanks [51], stirred tanks with serpentines [52], jacketed tubular reactors [53], stirred tanks with external heat exchangers [54], microreactors [55] and the reactor of the present disclosure [56].

In an embodiment, for instance, in metal devices, fabrication techniques generally limit the possible range of values of the mixing chambers depth, $\omega$. Typically, this depth lays in the range of 0.25 mm to several millimetres, particularly 0.25 mm to 2.5 mm, where $\omega > 1$ mm are meso structured devices, and micro structured devices are for $\omega < 1$ mm. The use of said mixing chamber small depths increases the specific surface area available for heat transfer. The specific area for heat transfer for a network plate with prismatic channels and cylindrical mixing chambers, as in the embodiment of FIG. 3, is $$\frac{A}{V} \approx \left(\frac{1}{\omega}\right) \frac{1 + 2\left(\frac{\omega}{D}\right) + \frac{8}{\pi}\left(\frac{1}{D}\frac{d}{D} + \frac{\omega}{D}\frac{d}{D}\right)}{\frac{1}{2} + \frac{4}{\pi}\left(\frac{1}{D}\frac{d}{D}\right)}$$

where $\omega$ is the depth of the mixing chambers and channels, D is the mixing chamber diameter, d is the inlet and outlet prismatic channels width and l is the prismatic channels length. FIG. 5 shows the specific surface area of this invention and other reference industrial devices that constitute the state of the art for heat exchangers. Orders of magnitude larger specific surface areas can be obtained with this invention compared with state of the art (stirred tanks with jackets or serpentine, tubular reactors) and even larger values than the novel competing microreactors. Larger specific surface area and decreased conduction resistances increases the capacity of fluids in the network plate to transfer heat with the thermofluids.

Figure 6:
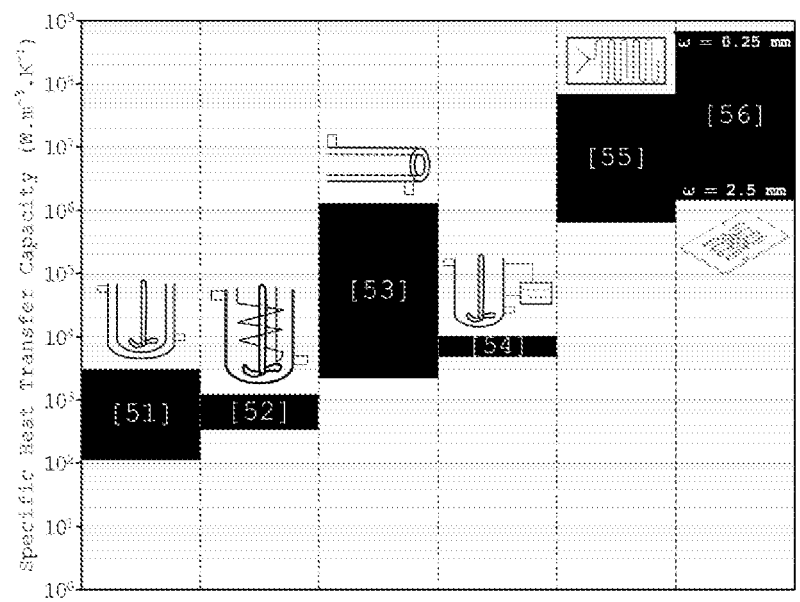
FIG. 6: Specific heat transfer capacity for jacketed stirred tanks [51], stirred tanks with serpentines [52], jacketed tubular reactors [53], stirred tanks with external heat exchangers [54], microreactors [55] and the reactor of the present disclosure [56].
Figure 7:
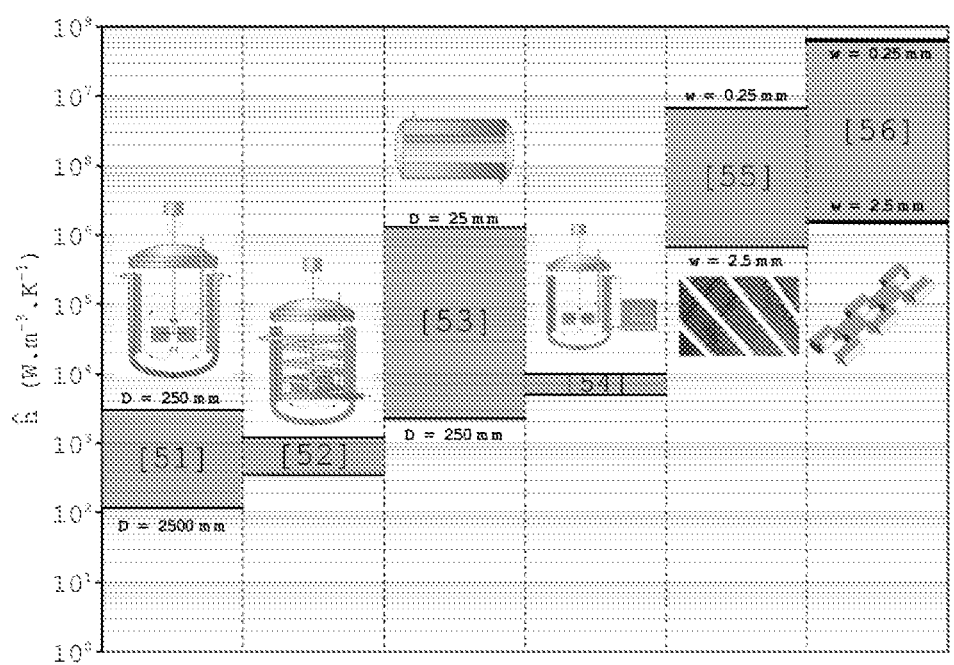
FIG. 7: Specific heat transfer capacity of typical heat exchangers equipment, in particular heat transfer capacity for jacketed stirred tanks [51], stirred tanks with serpentines [52], jacketed tubular reactors [53], stirred tanks with external heat exchangers [54], microreactors [55] and the reactor of the present disclosure [56].

In an embodiment, the global effect of maximizing heat transfer coefficients and minimizing equipment size can be synthesized into the specific heat transfer capacity, defined as $$\hat{q} = h \frac{A}{V}$$

where h is the heat transfer coefficient and $$\frac{A}{V}$$

is the area per volume unit ratio. FIG. 6 compares the said specific heat transfer capacity of this invention with state of the art devices, where again it is demonstrated that the global specific heat transfer capacity outperforms all other heat exchange devices.

In an embodiment, the present disclosure relates to a modular device where the basic units are the building blocks of large assemblies. The modularity advantages are scalability, flexible operation and the construction of industrial facilities. The scalability is the capability of this device to keep the same operational features, product properties and heat transfer efficiencies regardless of the production rates.

In an embodiment, the scalability is achieved by keeping the production rate in each unit within a defined range of operation for a specific application. The increase of production is made by numbering up the number of basic units.

In an embodiment, the flexible operation pertains to the possibility of changing production during operation. The energy efficiency and characteristics of products from continuous flow systems is affected by the residence time of the fluids inside the system. Pollution control technologies are specific cases where flow rates evolve during day, generally depend on human activities daily cycle. For such cases this modular device can maintain the flow rate of each basic unit by dynamically changing the number of active basic units.

Another advantage of this invention is the construction of large industrial facilities. The modular nature of this device enables easy standard construction of large sites by assembling any number of basic units as stackable blocks that are easily connected into a pipe manifold. This construction principle based on blocks enable easy and fast installation of large industrial sites.

In an embodiment, the heat transfer performance of the chemical reactor of the present disclosure was assessed and quantified. The embodiment is based on CFD simulation of a previously developed numerical model for 3D static reactor Costa M F, Fonte C M, Dias M M, Lopes J C B. Heat Transfer Performance of NETmix—A Novel Micro-Meso Structured Mixer and Reactor. AIChE J. 2017.

The reactor average unit cell Nusselt number was determined for different Reynolds numbers, and for two different boundary conditions: constant wall temperature and constant wall heat flux. In both cases, it was observed that the Nusselt number increases with increasing of the Reynolds number. It is observed that the existence of hot-spots is reduced when the flow patterns present an oscillatory behaviour, and the remaining are renewed with time, leading to a more efficient mixing and heat transfer.

The results show that for large Reynolds numbers, 3-5 times higher heat transfer rates can be achieved when compared to flow between parallel plates. Maximum convective heat transfer coefficients are achieved when the flow inside the mixing chambers evolves to a self-sustained oscillatory laminar flow regime. An important result obtained from these simulations is that, above the critical Reynolds number, the thermal boundary layer is renewed along the network of chambers, enhancing the global heat transfer capacity of chemical reactor of the present disclosure.

The chemical reactor of the present disclosure is a mixing device particularly suited to handle reactions where fast interfacial mass transfer is required, such as heterogeneous catalytic and gas-liquid reactions.

In an embodiment, the specific heat transfer capacity of chemical reactor of the present disclosure was compared to other commercially available technologies. It is observed that the chemical reactor of the present disclosure presents 2-5 orders of magnitude higher specific heat transfer capacity than most of the technologies used industrially, such as stirred tanks with jackets or tubular reactors, and nearly one order of magnitude larger specific heat transfer capacity than microreactors. The chemical reactor of the present disclosure performance is due to its very large surface to volume ratio together with the heat transfer coefficient enhancement exhibited from the CFD simulations and Nusselt number computations.

In an embodiment, chemical reactor/mixer of the present disclosure is a proficient technology to remove/supply heat from/to a fluid, making it suitable for fast reactions where heat transfer is the kinetically limiting step, and for highly exo/endothermic reactions, increasing the overall production capacity of the process.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A chemical reactor for exothermic or endothermic processes comprising a stack of a network mixer plate for performing the reaction and a heat exchanger plate,
   wherein the network mixer plate comprises an array of chambers, each chamber being interconnected by at least two channels to at least two other chambers, for mixing and dividing one or more reaction fluids sequentially through said chambers,
   wherein the heat exchanger plate comprises a channel for the flow of a thermofluid,
   wherein the channel of the heat exchanger plate and the chambers of the network mixer plate are lined up to transfer heat between said chambers of the network mixer plate and said channel of the heat exchanger plate,
   wherein each chamber of the network mixer plate is a spherical or cylindrical chamber, comprising two or three channels and two or three apertures for connection to said channels,
   wherein the chambers diameters of the network mixer plate are between 1 mm and 50 mm and the channels width or diameters of the network mixer plate are between 0.25 mm and 10 mm, and
   wherein the Reynolds number of the flow of the network mixer is larger than 100.

2. The reactor according to claim 1, wherein the chambers and channels depth of the network mixer plate are between 0.25 mm and 10 mm.

3. The reactor according to claim 1, wherein the Reynolds number of the flow of the network mixer is between 125 and 1000.

4. The reactor according to claim 1, comprising two heat exchanger plates wherein the network mixer plate is stacked between the heat exchanger plates.

5. The reactor according to claim 1, wherein at least two of the channels interconnected to each chamber of the network mixer plate are oblique relatively to the overall direction of fluid flow within the network mixer plate.

6. The reactor according to claim 1, wherein said channel of the heat exchanger plate is a meandering channel.

7. The reactor according to claim 1, wherein said channel of the heat exchanger plate comprises two or more interconnected cavities.

8. The reactor according to claim 7, wherein said cavities comprise baffles.

9. The reactor according to claim 1, wherein said heat exchanger plate comprises one or more through openings for fluid flow to, or from, or to and from, the network mixer plate.

10. The reactor according to claim 1, comprising a plurality of said network mixer plates and a plurality of said heat exchanger plates such that each network mixer plate is placed contiguously between two heat exchanger plates.

11. The reactor according to claim 1, wherein said network mixer plate comprise lateral inlets and lateral outlets.

12. The reactor according to claim 1, wherein said network mixer plate comprise top inlets and bottom outlets for connecting with contiguous plates.

13. The reactor according to claim 1, comprising one or more lid plates for providing fluid-tightness to said channels and/or chambers of the heat exchanger plate and of the network mixer plate.

* * * * *